(12) United States Patent
Wigard et al.

(10) Patent No.: US 12,677,200 B2
(45) Date of Patent: Jul. 7, 2026

(54) SWITCHING FROM A TERRESTRIAL CELL TO A NON-TERRESTRIAL CELL, AND RELATED DEVICES, METHODS AND COMPUTER PROGRAMS

(71) Applicant: Nokia Technologies Oy, Espoo (FI)

(72) Inventors: Jeroen Wigard, Klarup (DK); Mads Lauridsen, Gistrup (DK); Daniela Laselva, Klarup (DK)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 18/632,679

(22) Filed: Apr. 11, 2024

(65) Prior Publication Data

US 2024/0349149 A1      Oct. 17, 2024

(30) Foreign Application Priority Data

Apr. 12, 2023    (FI) ...................................... 20235411

(51) Int. Cl.
*H04W 36/08*          (2009.01)
(52) U.S. Cl.
CPC .................................. *H04W 36/083* (2023.05)

(58) Field of Classification Search
CPC ............. H04W 36/083; H04W 36/249; H04W 36/322; H04W 84/06; H04W 36/0011; H04W 36/0061; H04W 36/00835; H04W 36/00837; H04W 36/0085
USPC ........................................................ 370/331
See application file for complete search history.

(56) References Cited

U.S. PATENT DOCUMENTS

| | | | | |
|---|---|---|---|---|
| 2023/0068504 A1* | 3/2023 | Kumar | ................. | H04W 24/08 |
| 2023/0102334 A1* | 3/2023 | Roy | ................. | H04W 36/0085 |
| | | | | 370/316 |
| 2023/0308980 A1* | 9/2023 | Rune | ................. | H04B 7/18541 |
| 2024/0381063 A1* | 11/2024 | Grau | ..................... | H04W 8/005 |
| 2026/0046720 A1* | 2/2026 | Martin | ................. | H04W 36/08 |

* cited by examiner

*Primary Examiner* — Marnie A Matt
(74) *Attorney, Agent, or Firm* — Barta Jones, PLLC

(57) ABSTRACT
Devices, methods and computer programs for switching from a terrestrial cell to a non-terrestrial cell are disclosed. At least some example embodiments may allow switching a client device from a terrestrial cell to a non-terrestrial cell in such a way that the client device has time to prepare for the switch, and optionally perform tests related to a coverage of the non-terrestrial cell and inform a network node proposing the switch if the coverage is not sufficient. As a result, significant energy savings may be achieved on the network side, for example.

20 Claims, 3 Drawing Sheets

200

210

SWITCHING FROM A TERRESTRIAL CELL TO A NON-TERRESTRIAL CELL, AND RELATED DEVICES, METHODS AND COMPUTER PROGRAMS

TECHNICAL FIELD

The disclosure relates generally to communications and, more particularly but not exclusively, to switching from a terrestrial cell to a non-terrestrial cell, as well as related devices, methods and computer programs.

BACKGROUND

In a non-terrestrial network (NTN) system, base stations (such as fifth generation or 5G base stations, gNBs) may be deployed on-board or otherwise communicate via satellites to provide communication coverage over a very large area that may be otherwise unreachable by cellular networks. An NTN may be used, e.g., to connect internet of things (IoT) devices globally as well as to provide personal communications in remote areas, such as deserts, islands and open ocean, and/or in disaster situations, or the like.

Compared to terrestrial network (TN) systems, NTN systems may consume less energy on the network side at least in some situations. For example, NTN cells may be large (e.g., 50-1000 kilometres (km) in diameter) as a result of which energy consumed per km2 coverage is likely to be significantly lower than in a TN system.

Accordingly, from an energy-saving point of view, it may be desirable to steer client devices in a TN cell to switch to an NTN cell in some situations, such as when there are no active client devices in the TN cell.

Yet, at least in some situations there may be issues in such a switch to an NTN cell. For example, in some locations it may be hard to connect to an NTN cell, such as when being deep indoor. Therefore, merely turning off the TN cell could lead to client devices losing connectivity which would be highly undesirable.

Accordingly, at least in some situations, there may be a need for switching a client device from a terrestrial cell to a non-terrestrial cell in such a way that the client device has time to prepare for the switch, and optionally perform tests related to a coverage of the non-terrestrial cell and inform a network node proposing the switch if the coverage is not sufficient.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises at least one processor, and at least one memory storing instructions that, when executed by the at least one processor, cause the network node device at least to perform determining that a cell in a terrestrial network currently serving at least one client device is to be switched off at a switch-off time. The instructions, when executed by the at least one processor, further cause the network node device at least to perform transmitting, to the at least one client device, cell reselection information indicating the determined switch-off time and that the at least one client device is to initiate a cell reselection to a target cell before or at the determined switch-off time. In response to receiving feedback information from the at least one client device regarding the cell reselection to be initiated, the instructions, when executed by the at least one processor, further cause the network node device at least to perform determining whether to perform the switch-off at the indicated switch-off time based on the received feedback information.

In an example embodiment, alternatively or in addition to the above-described example embodiments, the target cell comprises a target cell in a candidate non-terrestrial network, and the cell reselection information further indicates at least one target resource in the target cell in the candidate non-terrestrial network.

In an example embodiment, alternatively or in addition to the above-described example embodiments, the received feedback information indicates whether the at least one client device is able to access the indicated at least one target resource in the target cell in the candidate non-terrestrial network.

In an example embodiment, alternatively or in addition to the above-described example embodiments, the instructions, when executed by the at least one processor, further cause the network node device to perform cancelling the switch-off of the currently serving cell in the terrestrial network or modifying the switch-off of the currently serving cell in the terrestrial network to exclude at least one cell beam associated with the at least one client device, in response to the received feedback information indicating that the at least one client device is unable to access the indicated at least one target resource in the target cell in the candidate non-terrestrial network.

In an example embodiment, alternatively or in addition to the above-described example embodiments, the instructions, when executed by the at least one processor, further cause the network node device to perform receiving a communication service expected-message in response to the transmitted cell reselection information. The received communication service expected-message indicates that the at least one client device is expecting to participate in a communication service within a time duration at least partially overlapping with the determined switch-off time. The instructions, when executed by the at least one processor, further cause the network node device to perform evaluating a capability of the target cell to provide the expected communication service. The instructions, when executed by the at least one processor, further cause the network node device to perform determining whether to provide the expected communication service before the switch-off of the currently serving cell in the terrestrial network, based on results of the evaluation.

An example embodiment of a method comprises determining, by a network node device, that a cell in a terrestrial network currently serving at least one client device is to be switched off at a switch-off time. The method further comprises transmitting, from the network node device to the at least one client device, cell reselection information indicating the determined switch-off time and that the at least one client device is to initiate a cell reselection to a target cell before or at the determined switch-off time. In response to receiving feedback information at the network node device from the at least one client device regarding the cell reselection to be initiated, the method further comprises determining, by the network node device, whether to perform the switch-off at the indicated switch-off time based on the received feedback information.

In an example embodiment, alternatively or in addition to the above-described example embodiments, the target cell comprises a target cell in a candidate non-terrestrial network, and the cell reselection information further indicates at least one target resource in the target cell in the candidate non-terrestrial network.

In an example embodiment, alternatively or in addition to the above-described example embodiments, the received feedback information indicates whether the at least one client device is able to access the indicated at least one target resource in the target cell in the candidate non-terrestrial network.

In an example embodiment, alternatively or in addition to the above-described example embodiments, the method further comprises cancelling, by the network node device, the switch-off of the currently serving cell in the terrestrial network or modifying, by the network node device, the switch-off of the currently serving cell in the terrestrial network to exclude at least one cell beam associated with the at least one client device, in response to the received feedback information indicating that the at least one client device is unable to access the indicated at least one target resource in the target cell in the candidate non-terrestrial network.

In an example embodiment, alternatively or in addition to the above-described example embodiments, the method further comprises receiving a communication service expected-message at the network node device in response to the transmitted cell reselection information. The received communication service expected-message indicates that the at least one client device is expecting to participate in a communication service within a time duration at least partially overlapping with the determined switch-off time. The method further comprises evaluating, by the network node device, a capability of the target cell to provide the expected communication service. The method further comprises determining, by the network node device, whether to provide the expected communication service before the switch-off of the currently serving cell in the terrestrial network, based on results of the evaluation.

An example embodiment of a computer program comprises instructions for causing a network node device to perform at least the following: determining that a cell in a terrestrial network currently serving at least one client device is to be switched off at a switch-off time; transmitting, to the at least one client device, cell reselection information indicating the determined switch-off time and that the at least one client device is to initiate a cell reselection to a target cell before the determined switch-off time; and in response to receiving feedback information from the at least one client device regarding the cell reselection to be initiated, determining whether to perform the switch-off at the indicated switch-off time based on the received feedback information.

An example embodiment of a client device comprises at least one processor, and at least one memory storing instructions that, when executed by the at least one processor, cause the client device at least to perform receiving, from a network node device, a cell reselection information indicating a switch-off time when a cell in a terrestrial network currently serving the client device is to be switched off and that the client device is to initiate a cell reselection to a target cell before the indicated switch-off time. The instructions, when executed by the at least one processor, further cause the client device at least to perform initiating the cell reselection to the target cell.

In an example embodiment, alternatively or in addition to the above-described example embodiments, the target cell comprises a target cell in a candidate non-terrestrial network, and the cell reselection information further indicates at least one target resource in the target cell in the candidate non-terrestrial network.

In an example embodiment, alternatively or in addition to the above-described example embodiments, the initiating of the cell reselection to the target cell comprises performing before at least the indicated switch-off time: executing at least one accessibility test for the indicated at least one target resource in the target cell in the candidate non-terrestrial network, and transmitting feedback information to the network node device based on results of the executed at least one accessibility test. The feedback information indicates whether the client device is able to access the indicated at least one target resource in the target cell in the candidate non-terrestrial network.

In an example embodiment, alternatively or in addition to the above-described example embodiments, the at least one accessibility test comprises at least one of a global navigation satellite system, GNSS, reception test, or a downlink reference signal received power, RSRP, level check.

In an example embodiment, alternatively or in addition to the above-described example embodiments, the instructions, when executed by the at least one processor, further cause the client device to perform determining that participation in a communication service is expected within a time duration at least partially overlapping with the indicated switch-off time. The instructions, when executed by the at least one processor, further cause the client device to perform transmitting a communication service expected-message to the network node device. The communication service expected-message indicates the expected participation in the communication service within the time duration at least partially overlapping with the indicated switch-off time.

In an example embodiment, alternatively or in addition to the above-described example embodiments, the at least one target resource in the target cell in the candidate non-terrestrial network comprises at least one of a radio access technology, a network layer, or a frequency layer.

In an example embodiment, alternatively or in addition to the above-described example embodiments, the client device is in a radio resource control, RRC, idle mode, in an RRC inactive mode, or in an RRC connected mode while receiving the cell reselection information and initiating the cell reselection.

An example embodiment of a method comprises receiving, at a client device from a network node device, a cell reselection information indicating a switch-off time when a cell in a terrestrial network currently serving the client device is to be switched off and that the client device is to initiate a cell reselection to a target cell before the indicated switch-off time. The method further comprises initiating, by the client device, the cell reselection to the target cell.

In an example embodiment, alternatively or in addition to the above-described example embodiments, the target cell comprises a target cell in a candidate non-terrestrial network, and the cell reselection information further indicates at least one target resource in the target cell in the candidate non-terrestrial network.

In an example embodiment, alternatively or in addition to the above-described example embodiments, the initiating of the cell reselection to the target cell comprises performing before at least the indicated switch-off time: executing at least one accessibility test for the indicated at least one target resource in the target cell in the candidate non-terrestrial network, and transmitting feedback information to the network node device based on results of the executed at least one accessibility test. The feedback information indicates whether the client device is able to access the indicated at least one target resource in the target cell in the candidate non-terrestrial network.

In an example embodiment, alternatively or in addition to the above-described example embodiments, the at least one accessibility test comprises at least one of a global navigation satellite system, GNSS, reception test, or a downlink reference signal received power, RSRP, level check.

In an example embodiment, alternatively or in addition to the above-described example embodiments, the method further comprises determining, by the client device, that participation in a communication service is expected within a time duration at least partially overlapping with the indicated switch-off time. The method further comprises transmitting a communication service expected-message from the client device to the network node device. The communication service expected-message indicates the expected participation in the communication service within the time duration at least partially overlapping with the indicated switch-off time.

In an example embodiment, alternatively or in addition to the above-described example embodiments, the at least one target resource in the target cell in the candidate non-terrestrial network comprises at least one of a radio access technology, a network layer, or a frequency layer.

In an example embodiment, alternatively or in addition to the above-described example embodiments, the client device is in a radio resource control, RRC, idle mode, in an RRC inactive mode, or in an RRC connected mode while receiving the cell reselection information and initiating the cell reselection.

An example embodiment of a computer program comprises instructions for causing a network node device to perform at least the following: receiving, from a network node device, a cell reselection information indicating a switch-off time when a cell in a terrestrial network currently serving the client device is to be switched off and that the client device is to initiate a cell reselection to a target cell before the indicated switch-off time; and initiating the cell reselection to the target cell.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
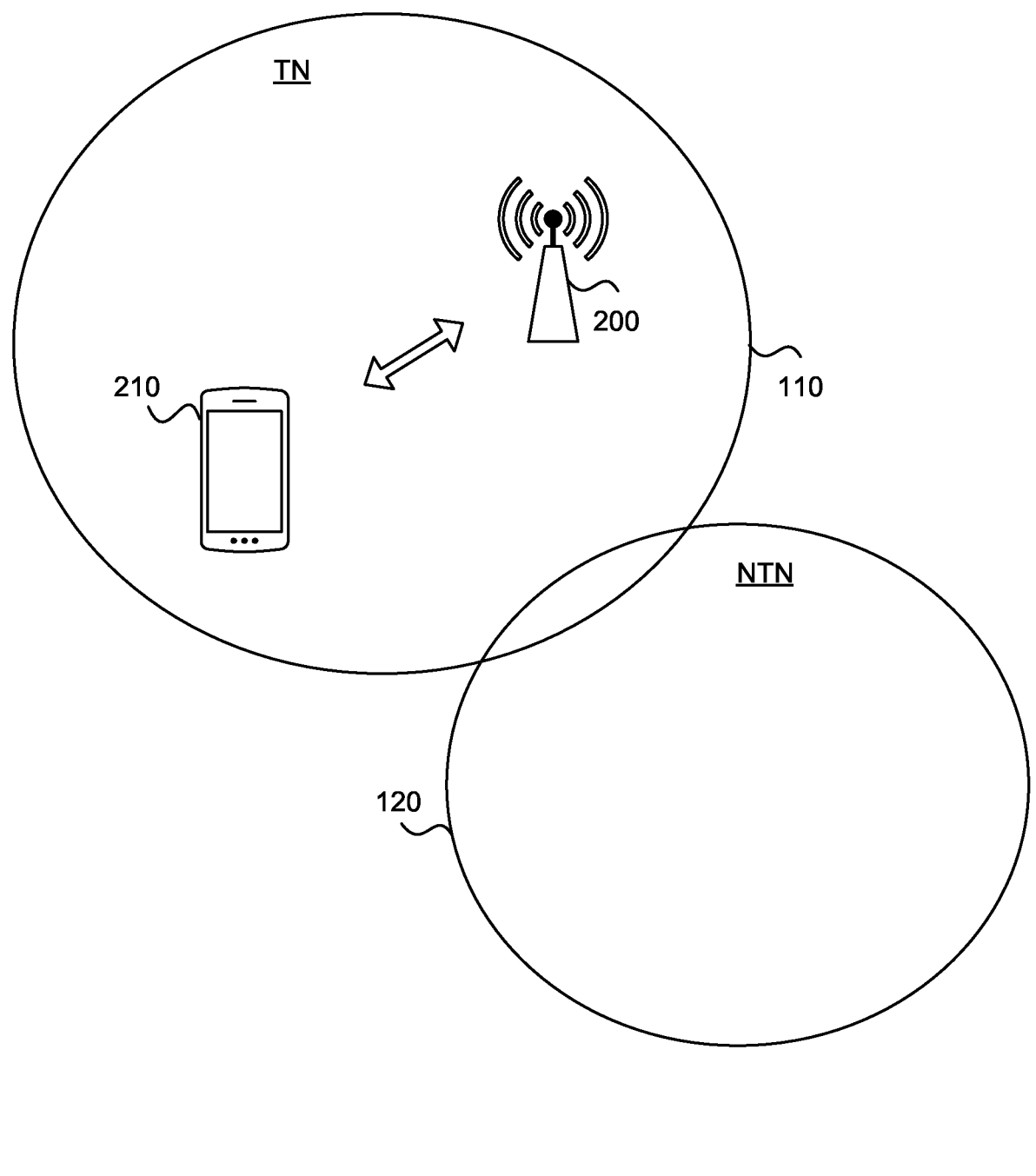
FIG. 1 shows an example embodiment of the subject matter described herein illustrating an example a system, where various embodiments of the present disclosure may be implemented.

FIG. 1 illustrates an example system 100, where various embodiments of the present disclosure may be implemented. The system 100 may comprise a terrestrial network (TN) 110 including, e.g., a fifth generation (5G) new radio (NR) network or a network beyond 5G wireless networks. An example representation of the system 100 is shown depicting a network node device 200 and a client device 210. At least in some embodiments, the TN 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the TN 110 may be configured to serve diverse service types and/or use cases, and it may logically be seen as comprising one or more networks. At least in some embodiments, the TN 110 may comprise more than one TN cells. For example, one TN cell may intend to power off and ask the client device 210 if it can reselect to another TN cell.

The client device 210 may include, e.g., a mobile phone, a smartphone, a tablet computer, a smart watch, or any hand-held, portable and/or wearable device. The client device 210 may also be referred to as a user equipment (UE). The network node device 200 may comprise a base station. The base station may include, e.g., any device suitable for providing an air interface for client devices to connect to a wireless network via wireless transmissions.

The system 100 may further comprise a non-terrestrial network (NTN) 120. For example, the NTN 120 may include a regenerative architecture in which radio access network nodes may correspond to or be included in satellites. Alternatively/additionally, the NTN 120 may include a transparent architecture which utilizes radio access network nodes located on Earth, with satellites acting as relays/mirrors of transmissions between a client device and a radio access network node.

In the following, various example embodiments will be discussed. At least some of these example embodiments described herein may allow switching a client device from a terrestrial cell to a non-terrestrial cell in such a way that the client device has time to prepare for the switch, and optionally perform tests related to a coverage of the non-terrestrial cell and inform a network node proposing the switch if the coverage is not sufficient. As a result, significant energy savings may be achieved on the network side, for example.

At least some of the example embodiments described herein may allow avoiding a situation in which a client device would be left without cellular service when a TN cell continues to switch off even though the client device cannot connect to an NTN cell, e.g., due to poor coverage.

At least some of the example embodiments described herein may allow a check before switching off the TN cell for energy saving, to avoid switching the TN cell off in such a way that would result in client devices losing connectivity.

Figure 2A:
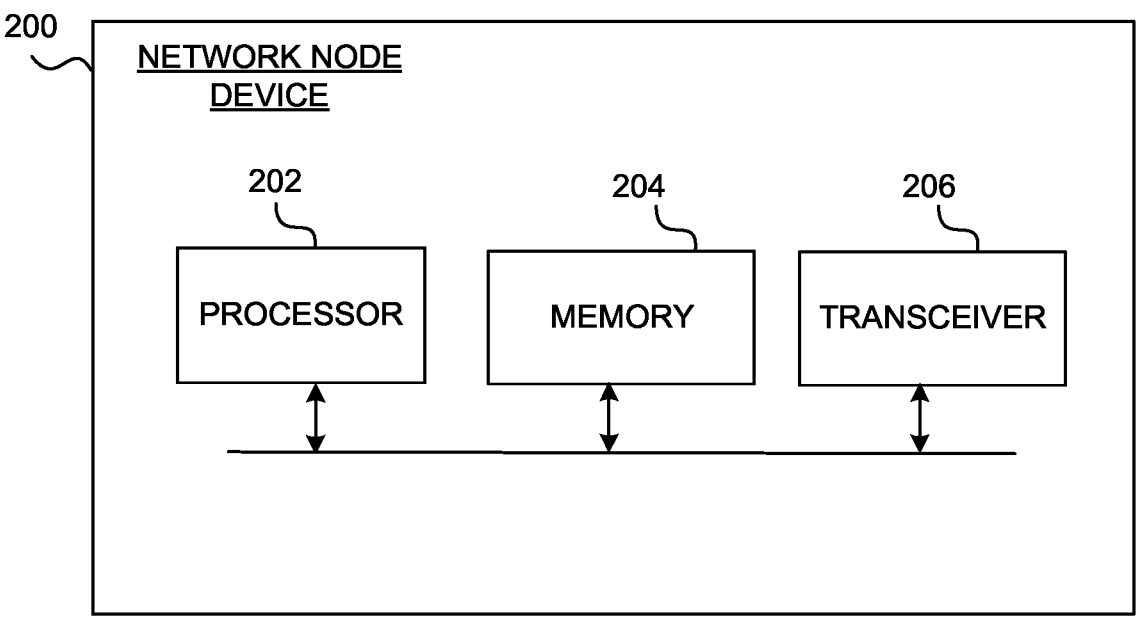
FIG. 2A shows an example embodiment of the subject matter described herein illustrating a network node device.

FIG. 2A is a block diagram of the network node device 200, in accordance with an example embodiment.

The network node device 200 comprises one or more processors 202 and one or more memories 204 that comprise computer program code. The network node device 200 may also include other elements, such as a transceiver 206 configured to enable the network node device 200 to transmit and/or receive information to/from other devices, as well as other elements not shown in FIG. 2A. In one example, the network node device 200 may use the transceiver 206 to transmit or receive signaling information and data in accordance with at least one cellular communication protocol. The transceiver 206 may be configured to provide at least one wireless radio connection, such as for example a 3GPP mobile broadband connection (e.g., 5G or beyond). The transceiver 206 may comprise, or be configured to be coupled to, at least one antenna to transmit and/or receive radio frequency signals.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, a tensor processing unit (TPU), a neural processing unit (NPU), or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may comprise a base station. The base station may include, e.g., a fifth-generation base station (gNB) or any such device providing an air interface for client devices to connect to the wireless network via wireless transmissions. The network node device 200 may comprise a terrestrial or non-terrestrial network node device.

When executed by the at least one processor 202, instructions stored in the at least one memory 204 cause the network node device 200 at least to perform determining that a cell in a terrestrial network 110 currently serving at least one client device 210 is to be switched off at a switch-off time. The switch-off may be performed, e.g., to save energy on the network side. At least in some embodiments, the switch-off may be temporary.

The instructions, when executed by the at least one processor 202, further cause the network node device 200 at least to perform transmitting, to the at least one client device 210, cell reselection information indicating the determined switch-off time and further indicating that the at least one client device 210 is to initiate a cell reselection to a target cell before the determined switch-off time.

For example, the cell reselection information may be transmitted via a broadcast signalling, a dedicated signalling, a system information broadcast, or it may be scheduled beforehand at, e.g., a fixed time every day.

When the at least one client device 210 completes the cell reselection, the at least one client device 210 may register (i.e., camp on) to the target cell selected in the cell reselection.

For example, the target cell may comprise a target cell in a candidate non-terrestrial network 120, and the cell reselection information may further indicate at least one target resource in the target cell in the candidate non-terrestrial network 120. The indicated at least one target resource is/are the one(s) to which the at least one client device 210 may camp on.

For example, the at least one target resource in the target cell in the candidate non-terrestrial network 120 may comprise a radio access technology (RAT), a network layer, and/or a frequency layer. At least in some embodiments, camping per layer may depend on client device types. At least in some embodiments, priorities may be given for different RATs and/or layers.

At least in some embodiments, the switch-off of the cell in the terrestrial network 110 currently serving the at least one client device 210 may be performed by ramping down synchronisation signal block (SSB) power of the cell in the terrestrial network 110 gradually. Furthermore, reselection priorities and/or thresholds may be adjusted to steer the at least one client device 210 away from the cell in the terrestrial network 110. For example, the ramping down of the SSB power and/or the adjustment of the reselection priorities and/or the thresholds may be started after transmitting the cell reselection information or after the at least one client device 210 has had a given amount of time to respond (e.g., after receiving from the at least one client device 210 feedback information described below).

In response to receiving feedback information from the at least one client device 210 regarding the cell reselection to be initiated, the instructions, when executed by the at least one processor 202, further cause the network node device 200 at least to perform determining whether to perform the switch-off at the indicated switch-off time based on the received feedback information.

At least in some embodiments, the received feedback information may indicate whether the at least one client device 210 is able to access the indicated at least one target resource in the target cell in the candidate non-terrestrial network 120.

At least in some embodiments, when no feedback is received, it may be interpreted as 'no objection', i.e., that the at least one client device 210 is able to access the indicated at least one target resource in the target cell in the candidate non-terrestrial network 120.

At least in some embodiments, the transmitted cell reselection information may further indicate that the at least one client device 210 is to provide the feedback information. Alternatively/additionally, the at least one client device 210 may provide the feedback information only when it cannot access the indicated at least one target resource in the target cell in the candidate non-terrestrial network 120.

At least in some embodiments, the instructions, when executed by the at least one processor 202, may further cause the network node device 200 to perform cancelling the switch-off of the currently serving cell in the terrestrial network 110 (e.g., via updating the cell reselection information to no longer include the switch-off time indication) or modifying the switch-off of the currently serving cell in the terrestrial network 110 to exclude at least one cell beam associated with the at least one client device 210, in response to the received feedback information indicating that the at least one client device 210 is unable to access the indicated at least one target resource in the target cell in the candidate non-terrestrial network 120.

In other words, when the at least one client device 210 sends an indication of being unable to camp on the target cell/layer(s)/RAT(s), the network node device 200 may decide to not turn off the currently serving cell in the terrestrial network 110, or to only turn off a subset of beams, e.g., depending on the at least one client device 210 sending the feedback information.

At least in some embodiments, when there are less than a given amount of client devices able to connect to the network node device 200, the instructions, when executed by the at least one processor 202, may further cause the network node device 200 to perform the switch-off anyway (e.g., to save costs).

At least in some embodiments, the instructions, when executed by the at least one processor 202, may further cause the network node device 200 to perform receiving a communication service expected-message in response to the transmitted cell reselection information. The received communication service expected-message may indicate that the at least one client device 210 is expecting to participate in a communication service within a time duration at least partially overlapping with the determined switch-off time. The instructions, when executed by the at least one processor 202, may further cause the network node device 200 to perform evaluating a capability of the target cell to provide the expected communication service. The instructions, when executed by the at least one processor 202, may further cause the network node device 200 to perform determining whether to provide the expected communication service before the switch-off of the currently serving cell in the terrestrial network 110, based on results of the evaluation.

In other words, the at least one client device 210 may indicate that it expects to perform, e.g., a voice call and/or data transfer in the near future (optionally indicating the expected time). The network node device 200 may then evaluate if the target NTN cell 120 is able provide the required service or whether it is better to first complete the requested service via the currently serving TN cell 110 and then shutdown the serving TN cell 110.

Figure 2B:
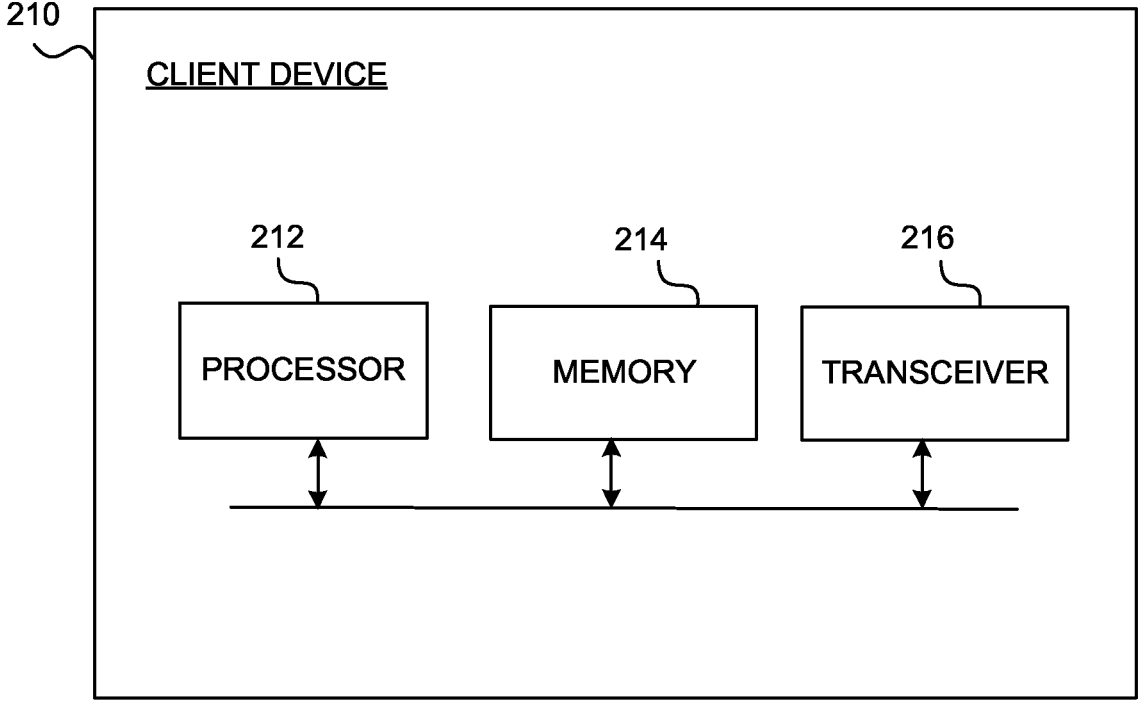
FIG. 2B shows an example embodiment of the subject matter described herein illustrating a client device.

FIG. 2B is a block diagram of a client device 210, in accordance with an example embodiment.

The client device 210 comprises at least one processor 212 and at least one memory 214 including computer program code. The client device 210 may also include other elements, such as a transceiver 216 configured to enable the client device 210 to transmit and/or receive information to/from other devices, as well as other elements not shown in FIG. 2B. In one example, the client device 210 may use the transceiver 216 to transmit or receive signaling information and data in accordance with at least one cellular communication protocol. The transceiver 216 may be configured to provide at least one wireless radio connection, such as for example a 3GPP mobile broadband connection (e.g., 5G or beyond). The transceiver 216 may comprise, or be configured to be coupled to, at least one antenna to transmit and/or receive radio frequency signals.

Although the client device 210 is depicted to include only one processor 212, the client device 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, a tensor processing unit (TPU), a neural processing unit (NPU), or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The client device 210 may comprise any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (eMBB) devices, ultra-reliable low-latency communication (URLLC) devices, and/or devices mounted in vehicles, etc.

When executed by the at least one processor 212, instructions stored in the at least one memory 214 cause the client device 210 at least to perform receiving, from the network node device 200, the cell reselection information indicating the switch-off time when the cell in the terrestrial network 110 currently serving the client device 210 is to be switched off, and further indicating that the client device 210 is to initiate the cell reselection to the target cell before or at the indicated switch-off time.

The instructions, when executed by the at least one processor 212, further cause the client device 210 at least to perform initiating the cell reselection to the target cell.

At least in some embodiments, the client device 210 may be in a radio resource control (RRC) idle mode, in an RRC inactive mode, or in an RRC connected mode while receiving the cell reselection information and/or initiating the cell reselection.

For the RRC connected mode, it may be a measurement configuration for a target cell, i.e., to prepare a potential handover. In such a case, the corresponding measurement report may be defined to be triggered before the switch-off and to indicate whether the client device 210 is able to access the target cell or not.

At least in some embodiments, the initiating of the cell reselection to the target cell may comprise performing the following before at least the indicated switch-off time: executing at least one accessibility test for the indicated at least one target resource in the target cell in the candidate non-terrestrial network 120, and transmitting feedback information to the network node device 200 based on results of the executed at least one accessibility test. As described above in more detail, at least in some embodiments the received cell reselection information may further indicate that the at least one client device 210 is to provide the feedback information (and to execute the at least one accessibility test in order to obtain the feedback information). As described above in more detail, the feedback information may indicate whether the client device 210 is able to access the indicated at least one target resource in the target cell in the candidate non-terrestrial network 120. For example, the feedback information may be transferred in a suitable system information block (SIB), such as a SIB defining a measurement configuration.

In other words, the at least one accessibility test may be executed before completing the cell reselection to the target cell at the network node device 200. If the results of the at least one accessibility test indicate that the client device 210 is unable to access the indicated at least one target resource in the target cell in the candidate non-terrestrial network 120, the cell reselection to the target cell may be cancelled or aborted as described above in connection with the network node device 200.

In other words, when the result of the at least one accessibility test is negative, then the client device 210 may send an indication to the network node device 200 that the client device 210 cannot camp on the target cell/layer(s)/RAT(s).

As mentioned above, the executing of the at least one accessibility test and the transmitting of the feedback information may be performed before at least the indicated switch-off time. At least in some embodiments, these may be performed early enough before the indicated switch-off time to allow the network node 200 to perform the cancelling of the switch-off of the currently serving cell or the modifying of the switch-off of the currently serving cell in response to the feedback information indicating that the at least one client device 210 is unable to access the indicated at least one target resource.

At least in some embodiments, the at least one accessibility test may comprise a global navigation satellite system (GNSS) reception test, and/or a downlink reference signal received power (RSRP) level check.

For example, the at least one accessibility test may comprise performing cell reselection and including a test of the GNSS reception when an NTN RAT is involved.

At least in some embodiments, the GNSS reception test may comprise a test of whether the at least one client device 210 is able to obtain a position fix, i.e., a test of whether the at least one client device 210 is able to determine its location based on the GNSS reception with an accuracy such that the at least one client device 210 is able to comply with time and frequency synchronization requirements related to the target cell, because the at least one client device 210 may use the location to perform pre-compensation of uplink transmissions in time and frequency domains.

At least in some embodiments, the RSRP level check may comprise an RSRP level check for a target cell in a target frequency layer whether it exceeds a threshold (e.g., either a client device implementation specific threshold or a network node device configured threshold).

At least in some embodiments, the at least one client device 210 may perform a tracking or registration area update (e.g., after any accessibility test in which the at least one client device 210 decides to reselect), and a new network layer/RAT may inform a source network layer that the at least one client device 210 has moved away, for example.

For another example, the at least one accessibility test may comprise checking downlink received power levels (RSRP) of the target RAT/layer. For example, these may be implemented with specific RSRP thresholds or set by a source network.

For another example, the at least one accessibility test may comprise checking GNSS reception when the layer is an NTN layer and when it is required to access/communicate over the NTN layer. For example, when the at least one client device 210 is stationary and knows its coordinates, this may be skipped.

At least in some embodiments, multiple layers/RATs/cells may be tested.

At least in some embodiments, the network (e.g., the network node device 200) may define a deadline for when the at least one client device 210 is to provide the result(s) of the accessibility test(s). E.g., the at least one client device 210 is to transmit the feedback information/result(s) of the accessibility test(s) at the latest x seconds before the indicated switch-off time.

For example, when the TN cell 110 is currently only serving RRC idle/inactive client device(s) 210, the network node device 200 may inform the client device(s) 210 about the switch-off time, and optionally the deadline and/or the target measurements (RATs, frequency layers, GNSS, etc.) via, e.g., a SIB, since the client device(s) 210 may not be monitoring for client device specific scheduling of information. The switch-off time and the optional deadline may be carried, e.g., in an SIB1, while the target measurement configurations may be provided, e.g., in SIBs 2-5. Alternatively, the switch-off time and the optional deadline may also be carried in the SIBs 2-5, for example.

When a client device 210 decides to report negative feedback information, e.g., because it is unable to connect with the NTN cell 120 or unable to obtain an accurate GNSS location, an RRC idle/inactive client device 210 may first perform a random access to be able to transmit the negative feedback information. An example approach may involve use of a small data transmission.

When the TN cell 110 is serving at least one RRC connected client device 210, the TN cell 110 may configure new measurements for the at least one RRC connected client device 210 via, e.g., client device specific RRC signaling. The switch-off time and the optional deadline may be included as part of the measurement and reporting configuration. The network node device 200 may schedule dedicated resources for the feedback information (e.g., via a configured grant) or rely on the client device 210 transmitting a scheduling request and a buffer status report. For example, the feedback information may comprise a dedicated indication, or the feedback information may be included in a measurement report. For example, dedicated signalling for sending the negative feedback information may include medium access control (MAC) signalling, RRC signalling, and/or physical signal signalling. For example, the feedback information may correspond to a measurement report, e.g., what was the measured RSRP, and/or the feedback information may indicate, e.g., that no GNSS is available or that the GNSS is not sufficiently accurate.

At least in some embodiments, the instructions, when executed by the at least one processor 212, may further cause the client device 210 to perform determining that participation in a communication service is expected within a time duration at least partially overlapping with the indicated switch-off time. The instructions, when executed by the at least one processor 212, may further cause the client device 210 to perform transmitting the communication service expected-message to the network node device 200. As discussed above in more detail, the communication service expected-message may indicate the expected participation in the communication service within the time duration at least partially overlapping with the indicated switch-off time.

At least in some embodiments, the instructions, when executed by the at least one processor 212, may further cause the client device 210 to signal when the client device 210 is only able to access certain RATs/layers. For instance, when the client device 210 is only able to access a RAT in which roaming fees need to be paid, the client device 210 may send a message to the network node device 200 indicating this.

Further features of the client device 210 directly result from the functionalities and parameters of the network node device 200 and thus are not repeated here.

Figure 3:
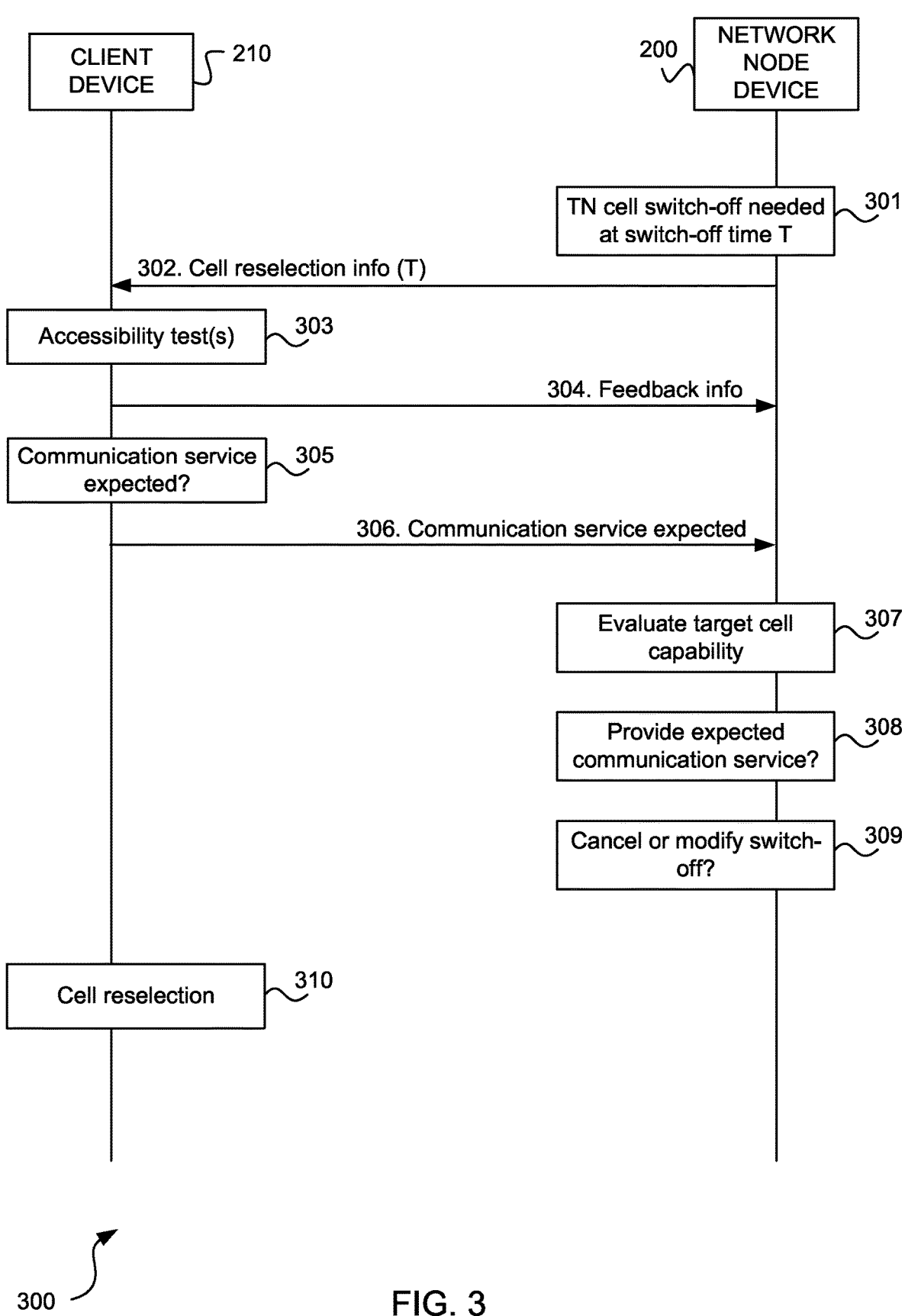
FIG. 3 shows an example embodiment of the subject matter described herein illustrating a method.

FIG. 3 illustrates an example signalling diagram 300 of a method, in accordance with an example embodiment.

At operation 301, the network node device 200 determines that the cell in the terrestrial network 110 currently serving at least one client device 210 is to be switched off at the switch-off time.

At operation 302, the network node device 200 transmits to the at least one client device 210 the cell reselection information indicating the determined switch-off time and further indicating that the at least one client device 210 is to initiate the cell reselection to the target cell before or at the determined switch-off time. Further at operation 302, the client device 210 receives the cell reselection information.

Next, the client device 210 initiates the cell reselection to the target cell. As discussed above in more detail, the initiating of the cell reselection to the target cell may comprise performing before at least the indicated switch-off time: executing at least one accessibility test at optional operation 303 for the indicated at least one target resource in the target cell in the candidate non-terrestrial network 120, and transmitting feedback information to the network node device 200 at optional operation 304 based on results of the executed at least one accessibility test. As discussed above in more detail, the feedback information may indicate whether the client device 210 is able to access the indicated at least one target resource in the target cell in the candidate non-terrestrial network 120. Further at optional operation 304, the network node device 200 may receive the feedback information.

At optional operation 305, the client device 210 may determine that participation in the communication service is expected within the time duration at least partially overlapping with the indicated switch-off time.

At optional operation 306, the client device 210 may transmit the communication service expected-message to the network node device 200. As discussed above in more detail, the communication service expected-message may indicate the expected participation in the communication service within the time duration at least partially overlapping with the indicated switch-off time. Further at optional operation 306, the network node device 200 may receive the communication service expected-message.

At optional operation 307, the network node device 200 may evaluate the capability of the target cell to provide the expected communication service.

At optional operation 308, the network node device 200 may determine whether to provide the expected communication service before the switch-off of the currently serving cell in the terrestrial network 110, based on results of the evaluation at optional operation 307.

In response to receiving the feedback information regarding the cell reselection to be initiated at operation 304, the network node device 200 determines at operation 309 whether to perform the switch-off at the indicated switch-off time based on the received feedback information. For example, the network node device 200 may cancel the switch-off of the currently serving cell in the terrestrial network 110, or modify the switch-off of the currently serving cell in the terrestrial network 110 to exclude at least one cell beam associated with the at least one client device 210, in response to the received feedback information indicating that the at least one client device 210 is unable to access the indicated at least one target resource in the target cell in the candidate non-terrestrial network 120.

At optional operation 310, the client device 210 may complete the cell reselection and register (i.e., camp on) to the NTN cell selected in the cell reselection.

The method of diagram 300 may be performed by the network node device 200 of FIG. 2A and the client device 210 of FIG. 2B. The operations 301-302, 304, 306-309 can, for example, be performed by the at least one processor 202 and the at least one memory 204. The operations 302-304, 305-306, 310 can, for example, be performed by the at least one processor 212 and the at least one memory 214. Further features of the method of diagram 300 directly result from the functionalities and parameters of the network node device 200 and the client device 210, and thus are not repeated here. The method of diagram 300 can be performed by computer program(s).

The network node device 200 may comprise means for performing at least one method described herein. In one example, the means may comprise the at least one processor 202, and the at least one memory 204 storing instructions that, when executed by the at least one processor, cause the network node device 200 to perform the method.

The client device 210 may comprise means for performing at least one method described herein. In one example, the means may comprise the at least one processor 212, and the at least one memory 214 storing instructions that, when executed by the at least one processor, cause the client device 210 to perform the method.

The functionality described herein can be performed, at least in part, by one or more computer program product components such as software components. According to an embodiment, the network node device 200 and/or the client device 210 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Tensor Processing Units (TPUs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:
   at least one processor; and
   at least one memory storing instructions that, when executed by the at least one processor, cause the network node device at least to perform:
   determining that a cell in a terrestrial network currently serving at least one client device is to be switched off at a switch-off time;
   transmitting, to at least one client device, cell reselection information indicating a switch-off time and that the at least one client device is to initiate a cell reselection to a target cell before or at the switch-off time, wherein the target cell comprises a target cell in a candidate non-terrestrial network, and the cell reselection information further indicates at least one target resource in the target cell in the candidate non-terrestrial network;

initiating at least one accessibility test for the indicated at least one target resource in the target cell in the candidate non-terrestrial network, the at least one accessibility test comprising a test of global navigation satellite system (GNSS) reception, the GNSS reception test comprising performing, based on the at least one client device using a location to perform pre-compensation of uplink transmissions in time and frequency domains, at test of whether the at least one client device is able to determine a location of the at least one client device based on the GNSS reception with an accuracy such that the at least one client device is able to comply with time and frequency synchronization requirements related to the target cell;

based on the accessibility test, receiving feedback information regarding the cell reselection to be initiated;

based on the received feedback information regarding the cell reselection to be initiated, determining to perform the switch-off at the indicated switch-off time based on the received feedback information; and in response perform the switch-off at the indicated switch-off time based on the received feedback information, performing the switch-off of the cell in the terrestrial network to the target cell by:
   ramping down synchronisation signal block (SSB) power of the cell in the terrestrial network gradually; and
   adjusting reselection priorities and thresholds to steer the at least one client device away from the cell in the terrestrial network.

2. The network node device according to claim 1, wherein the received feedback information indicates whether the at least one client device is able to access the indicated at least one target resource in the target cell in the candidate non-terrestrial network.

3. The network node device according to claim 2, wherein the instructions, when executed by the at least one processor, further cause the network node device to perform:
   receiving a communication service expected-message in response to the transmitted cell reselection information, the received communication service expected-message indicating that the at least one client device is expecting to participate in a communication service within a time duration at least partially overlapping with the switch-off time;
   evaluating a capability of the target cell to provide the expected communication service; and
   based on results of the evaluation, determining to provide the expected communication service before the switch-off of the currently serving cell in the terrestrial network.

4. The network node device according to claim 3, wherein the at least one accessibility test may be executed before completing the cell reselection to the target cell at the network node device.

5. The network node device according to claim 4, wherein the accessibility test comprise checking GNSS reception when a layer is an non-terrestrial network (NTN) layer and when it is required to access and communicate over the NTN layer.

6. The network node device according to claim 5, wherein the instructions, when executed by the at least one processor, further cause the network node device to perform:

modifying the switch-off of the currently serving cell in the terrestrial network to exclude at least one cell beam associated with the at least one client device.

7. The network node device according to claim 6, wherein the instructions, when executed by the at least one processor, further cause the network node device to perform:

determining that a second switch-off from the target cell saves energy on a network side; and based on determining that the second switch-off from the target cell saves energy on the network side, performing the second switch-off from the target cell.

8. A system comprising:

an apparatus;

a processor;

a non-transitory computer-readable medium comprising computer-executable instructions that, when executed by the processor, cause the processor to perform the following operations:

determining that a cell in a terrestrial network currently serving at least one client device is to be switched off at a switch-off time;

transmitting, to at least one client device, cell reselection information indicating a switch-off time and that the at least one client device is to initiate a cell reselection to a target cell before or at the switch-off time, wherein the target cell comprises a target cell in a candidate non-terrestrial network, and the cell reselection information further indicates at least one target resource in the target cell in the candidate non-terrestrial network;

initiating at least one accessibility test for the indicated at least one target resource in the target cell in the candidate non-terrestrial network, the at least one accessibility test comprising a test of global navigation satellite system (GNSS) reception, the GNSS reception test comprising performing, based on the at least one client device using a location to perform pre-compensation of uplink transmissions in time and frequency domains, at test of whether the at least one client device is able to determine a location of the at least one client device based on the GNSS reception with an accuracy such that the at least one client device is able to comply with time and frequency synchronization requirements related to the target cell;

based on the accessibility test, receiving feedback information regarding the cell reselection to be initiated;

based on the received feedback information regarding the cell reselection to be initiated, determining to perform the switch-off at the indicated switch-off time based on the received feedback information; and in response perform the switch-off at the indicated switch-off time based on the received feedback information, performing the switch-off of the cell in the terrestrial network to the target cell by:

ramping down synchronisation signal block (SSB) power of the cell in the terrestrial network gradually; and adjusting reselection priorities and thresholds to steer the at least one client device away from the cell in the terrestrial network.

9. The system according to claim 8, wherein the received feedback information indicates whether the at least one client device is able to access the indicated at least one target resource in the target cell in the candidate non-terrestrial network.

10. The system according to claim 9, wherein the instructions, when executed by the at processor, further cause the processor to perform:

receiving a communication service expected-message in response to the transmitted cell reselection information, the received communication service expected-message indicating that the at least one client device is expecting to participate in a communication service within a time duration at least partially overlapping with the switch-off time;

evaluating a capability of the target cell to provide the expected communication service; and based on results of the evaluation, determining to provide the expected communication service before the switch-off of the currently serving cell in the terrestrial network.

11. The system according to claim 10, wherein the at least one accessibility test may be executed before completing the cell reselection to the target cell at the network node device.

12. The system according to claim 11, wherein the accessibility test comprise checking GNSS reception when a layer is an non-terrestrial network (NTN) layer and when it is required to access and communicate over the NTN layer.

13. The system according to claim 12, wherein the instructions, when executed by the processor, further cause the processor to perform:

modifying the switch-off of the currently serving cell in the terrestrial network to exclude at least one cell beam associated with the at least one client device.

14. The system according to claim 13, wherein the instructions, when executed by the processor, further cause the processor to perform:

determining that a second switch-off from the target cell saves energy on a network side; and based on determining that the second switch-off from the target cell saves energy on the network side, performing the second switch-off from the target cell.

15. A method comprising:

determining that a cell in a terrestrial network currently serving at least one client device is to be switched off at a switch-off time;

transmitting, to at least one client device, cell reselection information indicating a switch-off time and that the at least one client device is to initiate a cell reselection to a target cell before or at the switch-off time, wherein the target cell comprises a target cell in a candidate non-terrestrial network, and the cell reselection information further indicates at least one target resource in the target cell in the candidate non-terrestrial network;

initiating at least one accessibility test for the indicated at least one target resource in the target cell in the candidate non-terrestrial network, the at least one accessibility test comprising a test of global navigation satellite system (GNSS) reception, the GNSS reception test comprising performing, based on the at least one client device using a location to perform pre-compensation of uplink transmissions in time and frequency domains, at test of whether the at least one client device is able to determine a location of the at least one client device based on the GNSS reception with an accuracy such that the at least one client device is able to comply with time and frequency synchronization requirements related to the target cell;

based on the accessibility test, receiving feedback information regarding the cell reselection to be initiated;

based on the received feedback information regarding the cell reselection to be initiated, determining to perform the switch-off at the indicated switch-off time based on the received feedback information; and in response perform the switch-off at the indicated switch-off time based on the received feedback information, performing the switch-off of the cell in the terrestrial network to the target cell by:

ramping down synchronisation signal block (SSB) power of the cell in the terrestrial network gradually; and adjusting reselection priorities and thresholds to steer the at least one client device away from the cell in the terrestrial network.

16. The method according to claim 15, wherein the received feedback information indicates whether the at least one client device is able to access the indicated at least one target resource in the target cell in the candidate non-terrestrial network.

17. The method according to claim 16, further comprising:

receiving a communication service expected-message in response to the transmitted cell reselection information, the received communication service expected-message indicating that the at least one client device is expecting to participate in a communication service within a time duration at least partially overlapping with the switch-off time;

evaluating a capability of the target cell to provide the expected communication service; and based on results of the evaluation, determining to provide the expected communication service before the switch-off of the currently serving cell in the terrestrial network.

18. The method according to claim 17, wherein the at least one accessibility test may be executed before completing the cell reselection to the target cell at the network node device.

19. The method according to claim 18, wherein the accessibility test comprise checking GNSS reception when a layer is an non-terrestrial network (NTN) layer and when it is required to access and communicate over the NTN layer.

20. The method according to claim 19, further comprising modifying the switch-off of the currently serving cell in the terrestrial network to exclude at least one cell beam associated with the at least one client device.

\* \* \* \* \*